United States Patent
Nerone et al.

(10) Patent No.: US 8,779,689 B2
(45) Date of Patent: Jul. 15, 2014

(54) RAMP CONTROLLED DRIVER FOR SERIES/PARALLEL SOLID STATE LIGHTING DEVICES

(75) Inventors: Louis R. Nerone, Brecksville, OH (US); Deeder Aurongzeb, Mayfield Heights, OH (US)

(73) Assignee: General Electric Company, Schenectady, NY (US)

(*) Notice: Subject to any disclaimer, the term of this patent is extended or adjusted under 35 U.S.C. 154(b) by 707 days.

(21) Appl. No.: 12/966,184

(22) Filed: Dec. 13, 2010

(65) Prior Publication Data

US 2012/0146542 A1 Jun. 14, 2012

(51) Int. Cl.
- G05F 1/00 (2006.01)
- H02M 3/156 (2006.01)
- H05B 33/08 (2006.01)
- H02M 1/00 (2006.01)

(52) U.S. Cl.
CPC ... H05B 33/0815 (2013.01); *H02M 2001/0025* (2013.01); *H02M 3/156* (2013.01); H05B 33/0896 (2013.01)
USPC .......... 315/307; 315/308; 315/291; 315/209 R

(58) Field of Classification Search
CPC ..... H02P 27/08; H03F 3/2171; H03F 1/0238; H03F 3/2178; H02M 7/5387; H02M 7/5395; H02M 1/4258; H02M 3/33507; H02M 7/53871; H03K 17/00; H03K 17/56; H03K 5/086
USPC ............. 315/209 R, 210, 291, 297, 299, 307, 315/308, 362, 185 R, 192, 186, 193
See application file for complete search history.

(56) References Cited

U.S. PATENT DOCUMENTS

| | | | |
|---|---|---|---|
| 4,325,021 A | 4/1982 | McMackin | |
| 7,112,196 B2 | 9/2006 | Brosch et al. | |
| 7,358,490 B1 | 4/2008 | Hersam et al. | |
| 2004/0254471 A1 | 12/2004 | Hadjicostis et al. | |
| 2004/0254569 A1 | 12/2004 | Brosch et al. | |
| 2006/0202195 A1* | 9/2006 | Marks et al. | 257/40 |
| 2006/0245174 A1 | 11/2006 | Ashdown | |
| 2007/0108846 A1 | 5/2007 | Ashdown | |
| 2007/0236440 A1 | 10/2007 | Wacyk et al. | |
| 2008/0002102 A1 | 1/2008 | Lee | |
| 2008/0284346 A1 | 11/2008 | Lee | |
| 2009/0073156 A1 | 3/2009 | Fryer et al. | |

(Continued)

FOREIGN PATENT DOCUMENTS

| | | |
|---|---|---|
| EP | 1 973 385 | 9/2008 |
| GB | 2318467 A | 4/1998 |

(Continued)

OTHER PUBLICATIONS

International Search Report, International Application No. PCT/US2011/057794, Apr. 11, 2012.

(Continued)

*Primary Examiner* — Douglas W Owens
*Assistant Examiner* — Jianzi Chen
(74) *Attorney, Agent, or Firm* — Fay Sharpe LLP

(57) ABSTRACT

An electronic OLED driver apparatus is presented, which includes a DC-DC converter stage with a waveform generator generating converter setpoints with profiles having minimum rise time and fall time values.

15 Claims, 6 Drawing Sheets

(56) References Cited

U.S. PATENT DOCUMENTS

| | | | |
|---|---|---|---|
| 2010/0026204 A1 | 2/2010 | Hente et al. | |
| 2010/0033261 A1* | 2/2010 | Stevenson et al. | 332/109 |
| 2010/0052568 A1 | 3/2010 | Cohen | |
| 2010/0067152 A1* | 3/2010 | Nakahashi et al. | 361/18 |
| 2011/0057724 A1* | 3/2011 | Pabon | 327/581 |

FOREIGN PATENT DOCUMENTS

| | | |
|---|---|---|
| WO | WO 2006/013035 A | 2/2006 |
| WO | WO 2006/039789 A1 | 4/2006 |
| WO | WO 2007/120475 A2 | 10/2007 |

OTHER PUBLICATIONS

Written Search Opinion, International Application No. PCT/US2011/057794, Apr. 11, 2012.

Deang Liu, Feng Teng, Zheng Xu, Shengyi Yang, Shanyu Quan, Qingfang He, Yongsheng Wang, Xurong Xu, "Influence of capacitance effect on altering-current organic light-emitting diodes", 2005 Elsevier Ltd.

Hsi Chang, Yen-Shin Lai, "Novel AC driver and protection circuits with dimming control for light emitting diodes", 2007 IEEE.

* cited by examiner

RAMP CONTROLLED DRIVER FOR SERIES/PARALLEL SOLID STATE LIGHTING DEVICES

BACKGROUND OF THE DISCLOSURE

Large area solid-state devices, such as organic light-emitting diodes (OLEDS), are becoming more popular for illuminating buildings, roads, and for signage and optical display applications. Large area OLEDs have large capacitances and connection of parallel OLED strings in a lighting array increases the capacitance seen by a driver circuit. In addition, the capacitance may vary as the OLED is bent or twisted because of changes in charge distribution. For a given large area lighting installation, moreover, adding further OLEDs in series requires higher drive voltages. Thus, while large area OLED installations typically include series/parallel configurations, practical limitations exist for the number of series-connected OLEDs that can be driven and for the number of parallel-connected strings of series OLEDs. Thus, a need remains for improved techniques and apparatus for driving large area OLED arrays.

SUMMARY OF THE DISCLOSURE

The present disclosure provides apparatus for driving OLED arrays in which a waveform generator slows the rise and fall times of the current control setpoint of a DC-DC converter stage, thus avoiding or mitigating current spikes seen by highly capacitive OLED panels of the array. This control apparatus advantageously serves to slow the rise of current when the device is turned on or anytime a lighting setpoint involves step or rapid changes to increase or decrease the lighting output. The waveform control concept may be employed to combat output current overshoot, which may be 40% of rated current absent the disclosed concepts. The improved ability to operate large capacitance outputs without excessive current spikes can advantageously mitigate premature device degradation and thus extend the usable service-life of a given lighting installation. Moreover, series-connected OLEDs often suffer from individual elements not consistently illuminating during startup.

In accordance with one or more aspects of the present disclosure, an electronic driver apparatus is provided for powering an OLED array. The driver includes at least one DC-DC converter stage, along with a waveform generator providing a converter setpoint signal to a PWM circuit of the converter. The DC-DC converter has switching devices coupled in series between first and second DC input terminals, with first and second switching devices being joined at an internal node, as well as a driver which provides first and second switch control signals in complementary fashion to the switching devices based on a signal received at a driver control input. A PWM circuit provides a pulse width modulated signal to the driver control input according to a feedback signal and according to a converter setpoint signal from the waveform generator. The waveform generator receives an input setpoint signal, such as a user-selected dimming value representing a desired light output for the driven OLED array, and provides the converter setpoint signal based at least partially on driver setpoint signal, using minimum transition time values to avoid or mitigate current overshoot problems, where the converter setpoint signal has a specified rise and fall times that could be 1 us or more In certain embodiments, the waveform generator provides the converter setpoint signal having rise time and fall time values of 1 us or more and 10 ms or less, and the rise time and fall time values may be the same or may be different. In certain embodiments, the converter setpoint signal includes increasing and decreasing profiles, where at least a portion of the increasing and decreasing profiles are linear. In some implementations, moreover, at least a portion of the increasing and decreasing profiles may be nonlinear. The driver in some embodiments provides a second DC-DC converter between the ramp controlled DC-DC converter output and the OLED array.

In certain embodiments, the driver includes two or more DC-DC converters receiving the DC input power and providing individual outputs to drive corresponding OLED arrays. The individual converters include switching devices, a driver, and a PWM circuit providing a pulse width modulated signal to the driver control input according to a converter setpoint signal and a feedback signal. In certain embodiments, the individual DC-DC converters have a corresponding waveform generator providing the converter setpoint signal to the PWM circuit at least partially according to the driver setpoint signal, with rise time and fall time values of 1 us or more. In certain embodiments, a shared waveform generator provides a common converter setpoint signal to the PWM circuits of the individual DC-DC converters with controlled rise and fall times of 1 us or more.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
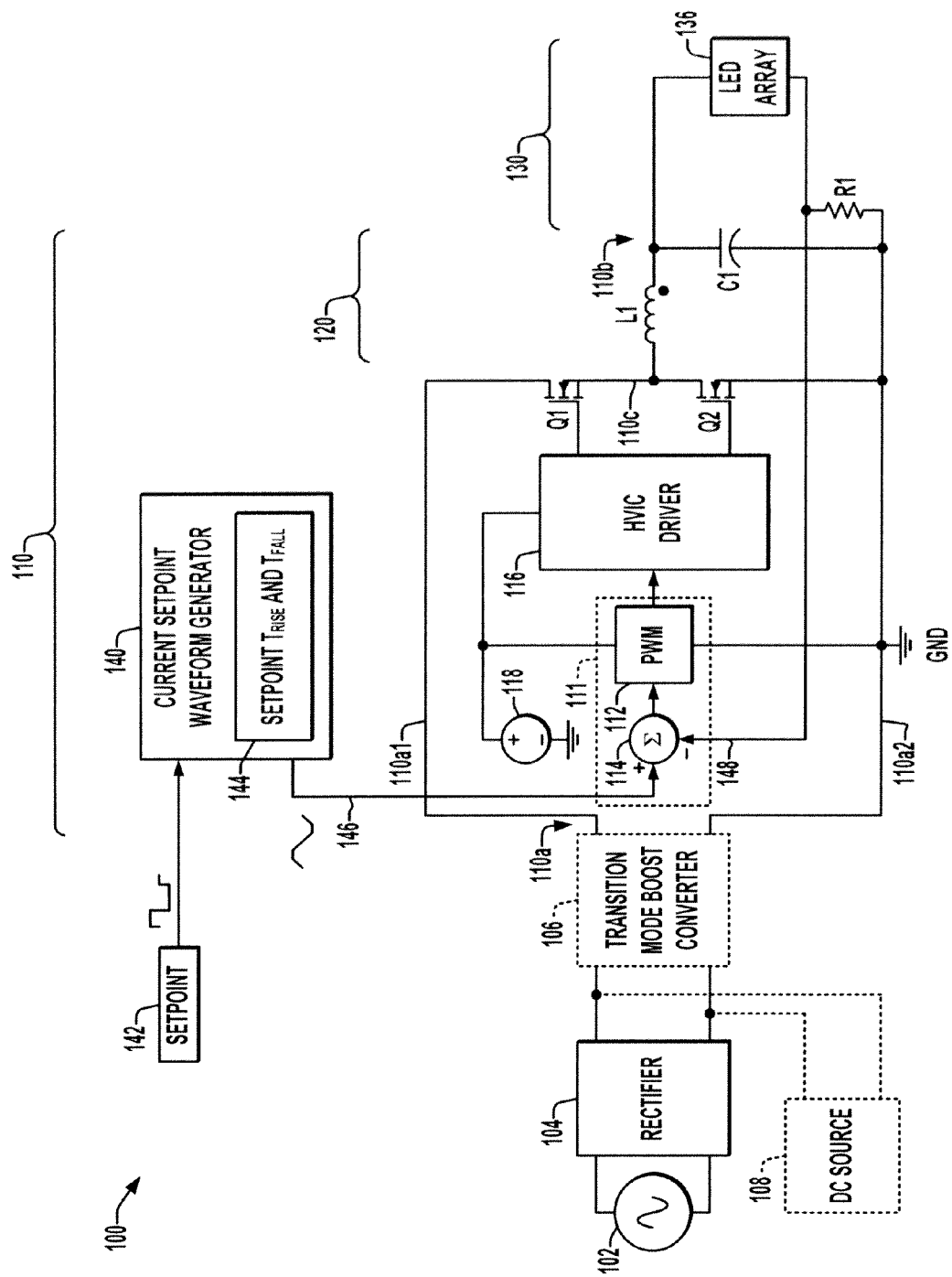
FIG. 1 is a schematic diagram illustrating an exemplary OLED driver apparatus having a PWM controlled DC-DC converter with loop compensator feedback and an adjustable output inductance in which a waveform generator provides ramped setpoint profiles with minimum rise and fall times.

Referring now to the drawings, like reference numerals are used to refer to like elements throughout and the various features are not necessarily drawn to scale. FIG. 1 illustrates an electronic driver apparatus 100 receiving input power from an AC source 102, with a rectifier 104 providing an initial DC output. The driver 100 may optionally include a transition mode boost converter 106 (shown in dashed line in the figure) converting the initial DC to provide a boosted DC input 110*a* to a loop compensated WPM controlled DC-DC converter 110. In certain embodiments, the apparatus 100 may instead receive DC input power directly from a DC source 108 (also shown in dashed line in the figure), with or without a transition mode boost converter 106. The DC-DC converter stage 110 converts the DC input power 110*a* to provide a DC output 110*b* used, directly, or indirectly, for powering an OLED array 136, which may include a series/parallel combination of organic LED panels 136. The driver 100, moreover, may include a second (output) converter 132 (e.g., a buck boost DC-DC converter, a boost-type DC-DC converter or other form of DC-DC converter) that converts the DC output 110*b* to provide drive current for powering the OLED array 136, as exemplified in FIGS. 5 and 6.

The DC-DC converter 110 receives DC input power at the input 110*a* and this DC bus power is selectively switched via first and second MOSFET switches Q1 and Q2 to selectively couple an intermediate converter node 110*c* with one of two DC bus lines 110*a*1 (e.g., positive) and 220*a*2 (negative), and a filter circuit 120 including a series inductor L1 and a DC output capacitor C1 is coupled between the internal node 110*c* and the DC-DC converter output 110*b*. The first and second switching devices Q1 and Q2 are n-channel devices in the illustrated embodiment, although other electrical switches can be used. Q1 in the illustrated implementation has a drain coupled with the upper DC bus line 110*a*1 and a source coupled to the drain of Q2 at the intermediate node 110*c*, with the source of Q2 being connected to the lower DC bus line 110*a*2. Q1 operates in a first switching state (ON) to electrically connect the first DC input terminal 110*a*1 to the intermediate output node 110*c* and in a second switching state (OFF) to disconnect the first DC input terminal 110*a*1 from the intermediate output node 110*c*. Q2 is similarly operative in a first switching state (ON) to electrically connect the intermediate output node 110*c* to the second DC input terminal 110*a*1 and in a second switching state (OFF) to disconnect the intermediate output node 110*c* from the second DC input terminal 110*a*1.

The converter 110 includes a PWM circuit 111 and a driver 116, in this case a high voltage integrated circuit (HVIC) driver with first and second driver outputs coupled to the control gates of Q1 and Q2, respectively. In the illustrated embodiment, the PWM circuit 111 includes a PWM controller 112 and an error amplifier 114 (shown as a summing junction generating an error input to the PWM controller 112), where the driver 116 and the PWM controller 112 are powered from a PWM supply 118, which can be derived from any power conversion circuit (not shown) supplying device power in the driver 100. The PWM circuit 111 provides a pulse width modulated (PWM) signal to the driver control input according to a converter setpoint signal 146 and a feedback signal 148, where the error amplifier 114 provides the error input to the PWM controller 112 as the difference between the converter desired value 146 and a feedback signal 148 derived from (and representing) the current supplied to the OLED array 136 via sense resistor R1. The driver 116 provides first and second switch control signals in complementary fashion to the switches Q1 and Q2 based at least partially on the signal received from the PWM controller 112 at the driver control input.

Figure 5:
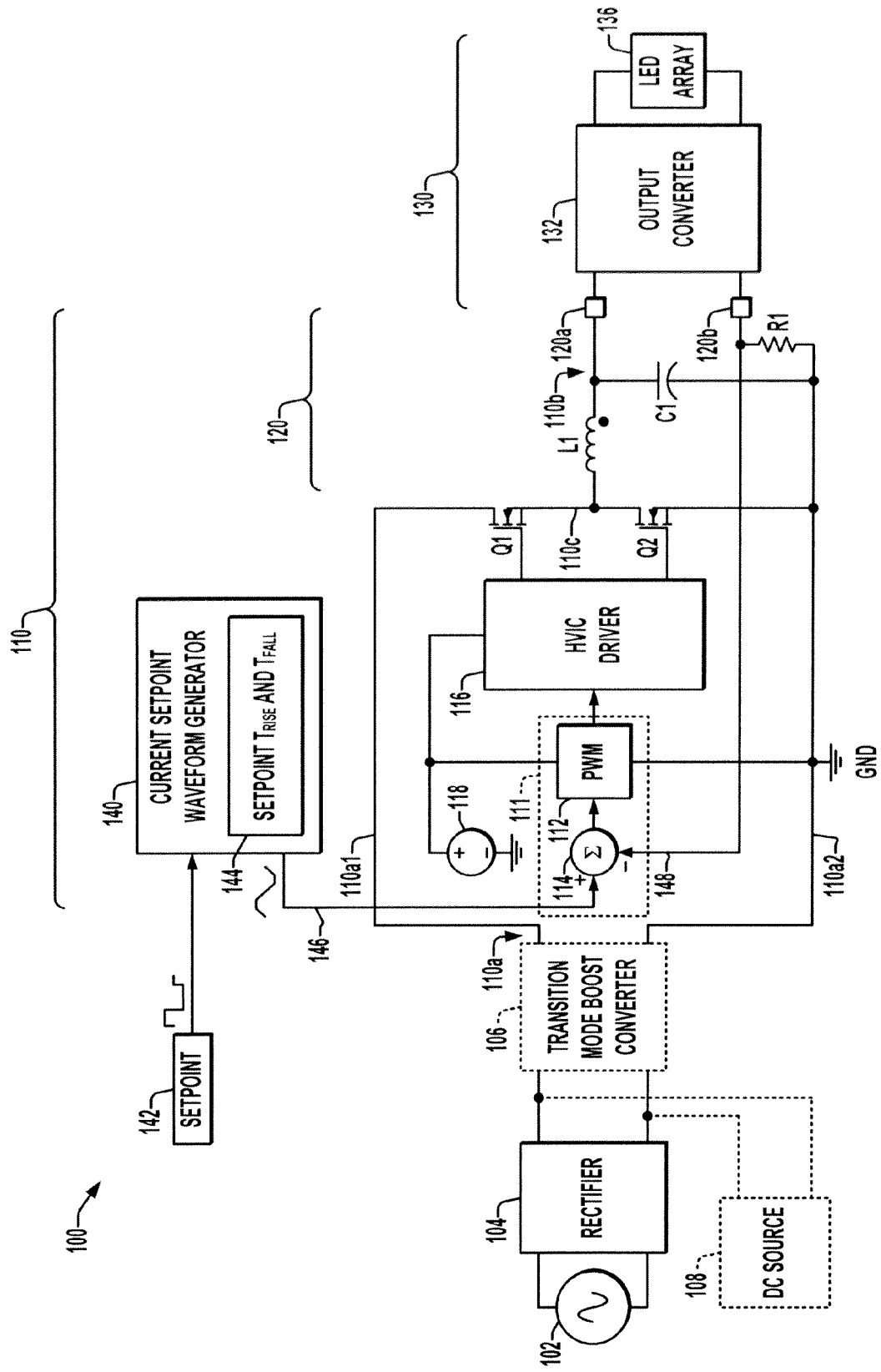
FIG. 5 is a schematic diagram illustrating another exemplary OLED driver apparatus with an adjustable output inductance and a waveform generator providing ramped setpoint profiles with minimum rise and fall times, including an output converter between the loop compensated DC-DC converter and a driven OLED array.

The output stage 130 may include a second or output converter stage 132 in certain embodiments, such as that shown in FIG. 5. The exemplary OLED array 136 in the illustrated embodiments includes one or more strings of OLEDs connected in series with combined operating voltage of 240V or less, although not a strict requirement of the disclosure. In other embodiments, the strings of OLEDs are in series with combined operating voltage of 120V or less, with multiple strings connected in parallel with operating voltages of around 120V or less. In certain embodiments, the OLED array 136 includes multiple strings in parallel with combined operating currents of about 1A or less. Moreover, in certain embodiments, the driver 100 has a minimum converter current set point of about 10% of the operating current of the OLED system, and the PWM circuit 111 uses a PWM clock frequency of about 100 kHz or less.

The apparatus includes a waveform generator 140 that receives an input setpoint signal 142, such as a desired light output signal from a user dimming control or from any other suitable light output setpoint source (not shown), where the light output setpoint can be a fixed value (e.g., the OLED array 136 is to be operated at 100% all the time while power is applied to the driver 100). The waveform generator 140 provides the converter setpoint signal 146 as a current setpoint to the PWM circuit 111 based at least in part on the driver setpoint signal 142, and operates to slow any fast transitions in the light setpoint 142 by providing or enforcing minimum rise and/or fall times in generating the converter setpoint signal 146. In the illustrated implementation, the waveform generator 140 can be an analog circuit, a progammable device, a processor-based circuit with suitable programming code, or combinations thereof, and includes one or more stored or programmed setpoint rise time and fall time values 144 ($T_{RISE}$ and $T_{FALL}$).

Figure 2:
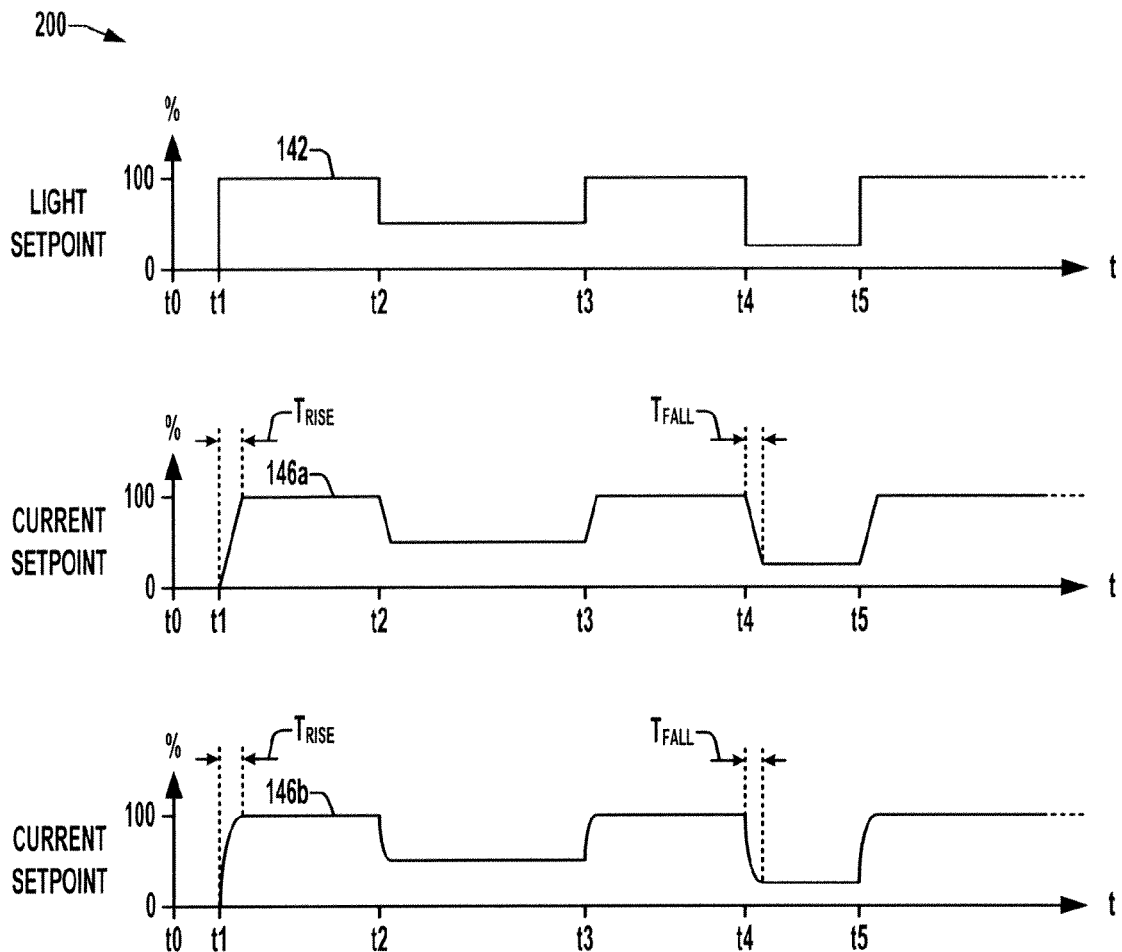
FIG. 2 is a graph showing waveforms of a user-selected lighting setpoint received by the waveform generator of FIG. 1 and two exemplary DC-DC converter current setpoint profiles provided by the waveform generator with minimum rise and fall time values.
Figure 3A:
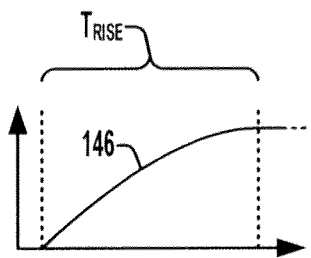
FIGS. 3A-3D are graphs illustrating various exemplary current setpoint rise time profiles implemented by the waveform generator of FIG. 1.
Figure 3B:
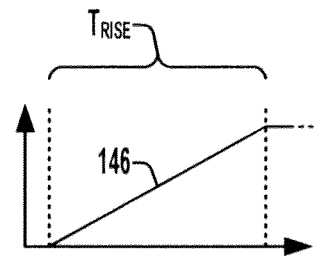
Figure 3C:
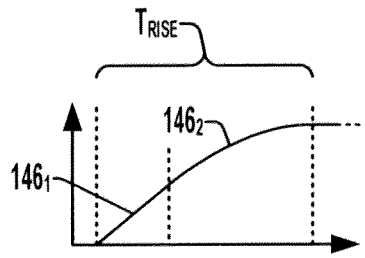
Figure 3D:
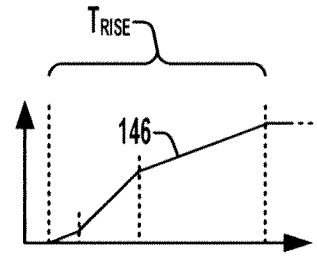

Referring also to FIGS. 2-4D, FIG. 2 shows a graph 200 illustrating an exemplary user-selected lighting setpoint 142 received by the waveform generator 140, which includes an initial step change from 0% to 100% light output at time t1, with a subsequent step change to a first intermediate light output value at t2, followed by a step change back to 100% at t3, a step change down to a second intermediate level at t4, and another step change back to full output at time t5. In this exemplary sequence, the step changes are slowed down by the waveform generator 140 by enforcing minimum rise times $T_{RISE}$ and minimum fall times $T_{FALL}$. FIG. 2 shows two exemplary DC-DC converter current setpoint profiles 146*a* and 146*b* corresponding to the received light setpoint signal value sequence 142, where the first example 146*a* provides generally linear ramp profiles in transitions between levels, and the second example 146*b* provides non-linear (e.g., curved) profiles for such transitions.

Figure 4A:
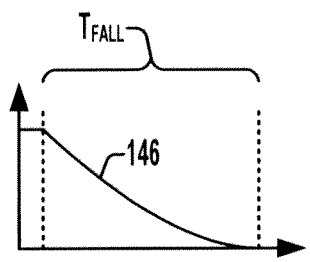
FIGS. 4A-4D are graphs illustrating various exemplary current setpoint fall time profiles implemented by the waveform generator of FIG. 1.
Figure 4B:
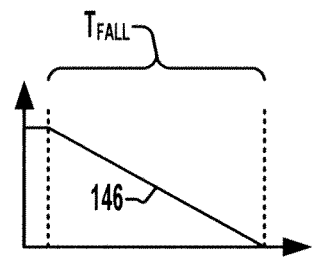
Figure 4C:
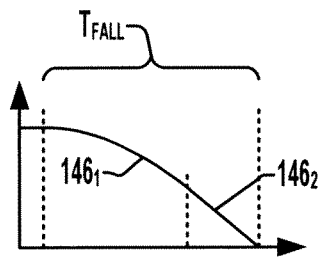
Figure 4D:
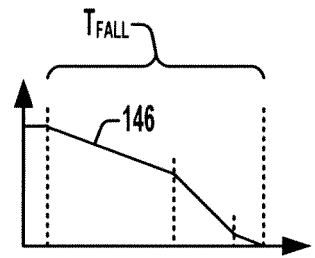

In the illustrated embodiments, the waveform genera or 140 provides the converter setpoint signal 146 having rise time values $T_{RISE}$ of 1 us or more and fall time values $T_{FALL}$ of 1 us or more. In certain implementations, moreover, the waveform generator 140 provides the converter setpoint signal 146 having rise time values $T_{RISE}$ of 1 us or more and 10 ms or less, and fall time values $T_{FALL}$ of 1 us or more and 10 ms or less, where the rise time value $T_{RISE}$ and the fall time value $T_{FALL}$ may, but need not be, different. Moreover, the profiles or shapes of the rising and falling transitions in the converter setpoint 146 can be at least partially linear, and/or at least partially curved or nonlinear. FIGS. 3A-3D show several detailed, non-limiting examples of converter se(point rise time profiles 146 provided by operation of the waveform generator 140, including a curved rising profile (FIG. 3A), a strictly linear profile (FIG. 3B), a composite profile (FIG. 3C) having a first linear portion 146$_1$ and a second curved portion 146$_2$, as well as a piecewise linear profile having multiple linear portions in FIG. 3D. FIGS. 4A-4D illustrate various exemplary current setpoint fall time profiles, including a curved profile (FIG. 4A), a straight (linear) profile (FIG. 4B), a decreasing profile having a curved portion $146_1$ and a linear portion $146_2$ (FIG. 4C), and a profile having several linear portions (FIG. 4D).

Referring also to FIG. 5, another driver embodiment 100 is shown having an output converter 132 coupled between the loop compensated DC-DC converter 110 and the OLED array 136. The output converter 132 can by any type of DC-DC converter, such as a buck-boost or boost-type output converter stage 132 in certain examples.

Figure 6:
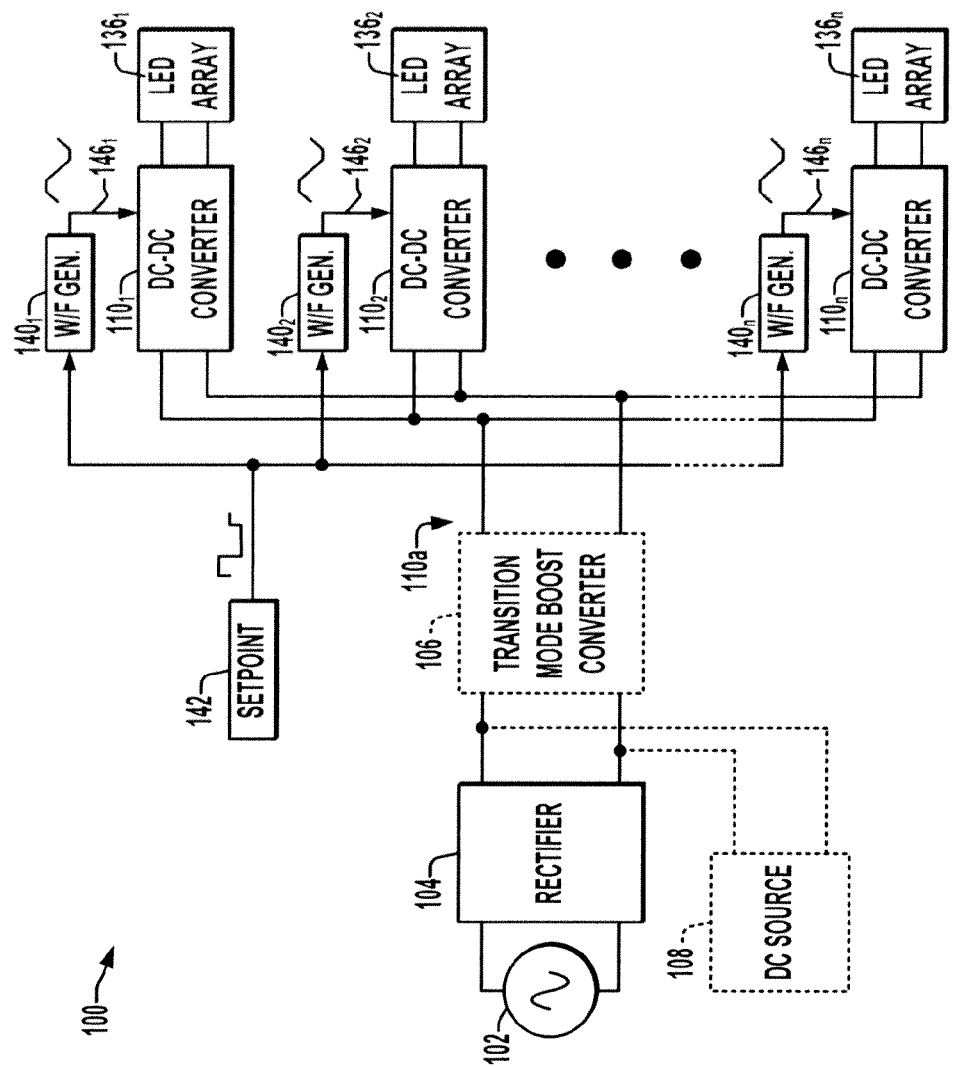
FIG. 6 is a schematic diagram illustrating an embodiment having multiple loop compensated DC-DC converters with corresponding waveform generators providing ramped converter setpoint profiles with minimum rise and fall times.
Figure 7:
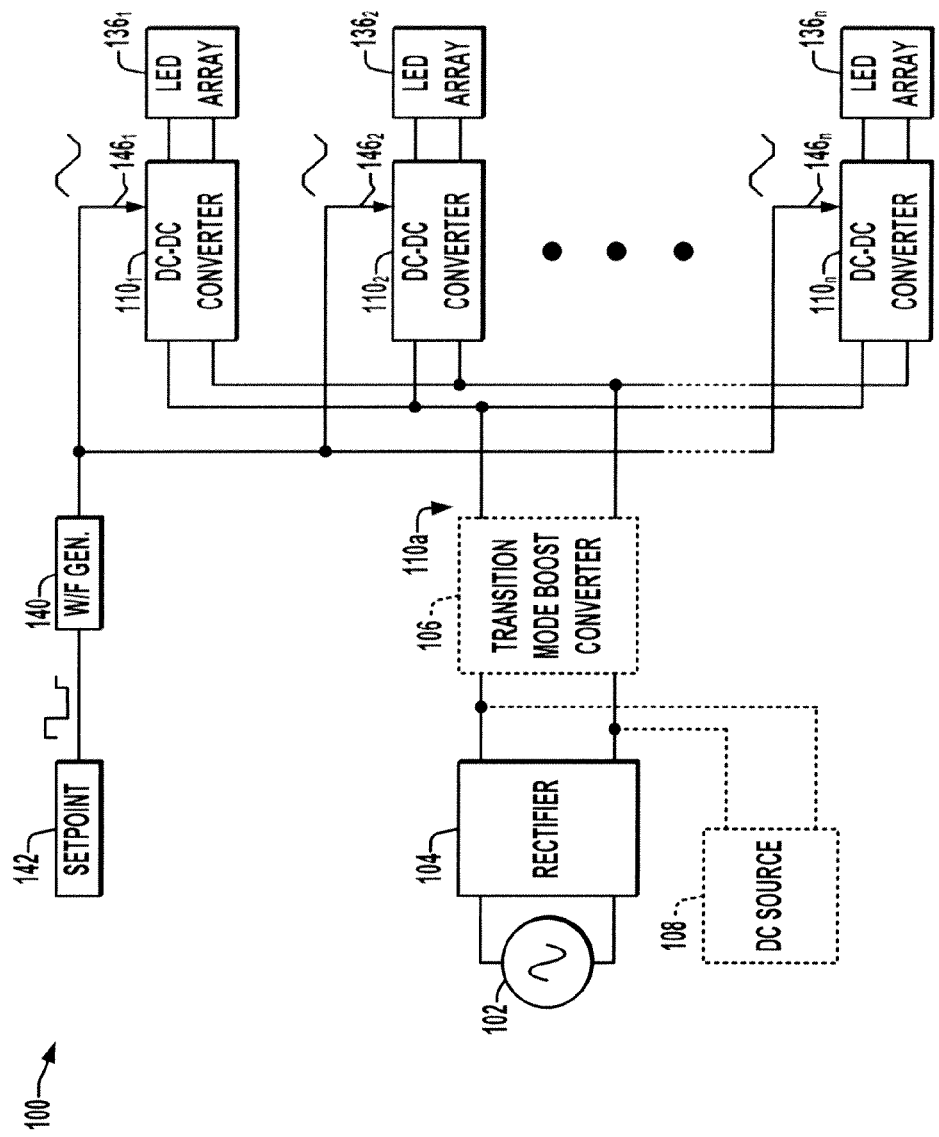
FIG. 7 is a schematic diagram illustrating another embodiment with multiple loop compensated DC-DC converters and a common waveform generator providing ramped converter setpoint profiles with minimum rise and fall times.

Referring also to FIGS. 6 and 7, FIG. 6 illustrates another driver apparatus embodiment 100 having multiple loop compensated DC-DC converters $110_1$-$110_n$ with corresponding waveform generators $140_1$-$140_n$ providing ramped converter setpoint profiles $146_1$-$146_n$ with minimum rise and fall times as described above. In this implementation, the waveform generators 140 can be individually configured to provide rise and or fall times $T_{RISE}$ and $T_{FALL}$ and corresponding waveform transition profiles as described above in a manner individualized according to the capacitance characteristics of the corresponding driven OLED array $136_1$-$136_n$. FIG. 7 shows another implementation using multiple loop compensated DC-DC converters $110_1$-$110_n$ with a shared waveform generator 140 providing ramped converter setpoint profiles with minimum rise and fall times $T_{RISE}$ and $T_{FALL}$.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. An electronic driver apparatus for powering an OLED array, comprising:
   a DC-DC converter with an input receiving DC input power and an output, the DC-DC converter comprising:
      first and second switching devices coupled in series between first and second DC input terminals, the first and second switching devices being joined at an internal node,
      a driver including a driver control input, the driver operative to provide first and second switch control signals in complementary fashion to the first and second switching devices, respectively, at least partially according to a signal received at the driver control input,
      a filter circuit coupled between the internal node and the DC-DC converter output, and
      a PWM circuit, comprising:
         an error amplifier with a first input receiving a converter setpoint signal, a second input receiving a feedback signal representing current supplied to the driven OLED array, and an error amplifier output providing an error signal representing a difference between the converter setpoint signal and the feedback signal, and
         a PWM controller with an input connected to the error amplifier output to receive the error signal, the PWM controller operative to provide a pulse width modulated signal to the driver control input according to the error signal; and
   a waveform generator receiving an input setpoint signal, the waveform generator operative to provide the converter setpoint signal to the PWM circuit at least partially according to the input setpoint signal, the converter setpoint signal having rise time values of 1 us or more and 10 ms or less and fall time values of his or more and 10 ms or less.

2. The electronic driver apparatus of claim 1, where the rise time values and the fall time values are different.

3. The electronic driver apparatus of claim 2, where the waveform generator provides the converter setpoint signal having increasing and decreasing profiles, and where at least a portion of at least one of the increasing and decreasing profiles are linear.

4. The electronic driver apparatus of claim 2, where the waveform generator provides the converter setpoint signal having increasing and decreasing profiles, and where at least a portion of at least one of the increasing and decreasing profiles are nonlinear.

5. The electronic driver apparatus of claim 2, comprising a second DC-DC converter including an input coupled with the DC-DC converter output, and providing a second DC output to drive the OLED array.

6. The electronic driver apparatus of claim 1, where the waveform generator provides the converter setpoint signal having increasing and decreasing profiles, and where at least a portion of at least one of the increasing and decreasing profiles are linear.

7. The electronic driver apparatus of claim 6, where the waveform generator provides the converter setpoint signal having increasing and decreasing profiles, and where at least a portion of at least one of the increasing and decreasing profiles are nonlinear.

8. The electronic driver apparatus of claim 6, comprising a second DC-DC converter including an input coupled with the DC-DC converter output, and providing a second DC output to drive the OLED array.

9. The electronic driver apparatus of claim 1, where the waveform generator provides the converter setpoint signal having increasing and decreasing profiles, and where at least a portion of at least one of the increasing and decreasing profiles are nonlinear.

10. The electronic driver apparatus of claim 1, comprising a second DC-DC converter including an input coupled with the DC-DC converter output, and providing a second DC output to drive the OLED array.

11. An electronic driver apparatus of claim 1, comprising a plurality of DC-DC converters receiving the DC input power and providing individual outputs to drive corresponding OLED arrays, the DC-DC converters individually comprising:
  first and second switching devices coupled in series between first and second DC input terminals, the first and second switching devices being joined at an internal node;
  a driver including a driver control input, the driver operative to provide first and second switch control signals in complementary fashion to the first and second switching devices, respectively, at least partially according to a signal received at the driver control input;
  a filter circuit coupled between the internal node and the DC-DC converter output;
  a PWM circuit operative to provide a pulse width modulated signal to the driver control input according to a converter setpoint signal and a feedback signal; and
  a waveform generator receiving an input setpoint signal, the waveform generator operative to provide the converter setpoint signal to the PWM circuit at least partially according to the input setpoint signal, the converter setpoint signal having rise time values of 1 µs or more and 10 ms or less and fall time values of 1 µs or more and 10 ms or less.

12. An electronic driver apparatus of claim 1, comprising:
  a plurality of DC-DC converters receiving the DC input power and providing individual outputs to drive corresponding OLED arrays, the DC-DC converters individually comprising:
    first and second switching devices coupled in series between first and second DC input terminals, the first and second switching devices being joined at an internal node;
    a driver including a driver control input, the driver operative to provide first and second switch control signals in complementary fashion to the first and second switching devices, respectively, at least partially according to a signal received at the driver control input,
    a filter circuit coupled between the internal node and the DC-DC converter output, and
    a PWM circuit operative to provide a pulse width modulated signal to the driver control input according to a converter setpoint signal and a feedback signal; and
  a waveform generator receiving an input setpoint signal, the waveform generator operative to provide the converter setpoint signal to the plurality of DC-DC converters at least partially according to the input setpoint signal, the converter setpoint signal having rise time values of 1 µs or more and 10 ms or less and fall time values of 1 µs or more and 10 ms or less.

13. The electronic driver apparatus of claim 1, where the input setpoint signal is a current control setpoint signal to set an output level of the DC-DC converter via the PWM circuit; and where the waveform generator is operative to provide the converter setpoint signal to the PWM circuit by slowing the rise and fall times of the current control setpoint signal to mitigate current spikes seen by an OLED array connected to the output of the DC-DC converter.

14. An electronic driver apparatus for powering an OLED array, comprising:
  a DC-DC converter, comprising:
    an input comprising first and second DC input terminals for receiving DC input power;
    an output for providing DC output power to a driven OLED array;
    first and second switching devices coupled in series between the first and second DC input terminals, the first and second switching devices being joined at an internal node,
    a driver including a driver control input, the driver operative to provide first and second switch control signals in complementary fashion to the first and second switching devices, respectively, at least partially according to a pulse width modulated signal received at the driver control input,
    a filter circuit coupled between the internal node and the output of the DC-DC converter, and
    a PWM circuit, comprising:
      an error amplifier with a first input receiving a converter setpoint signal, a second input receiving a feedback signal representing current supplied to driven OLED array, and an error amplifier output providing an error signal representing a difference between the converter setpoint signal and the feedback signal, and
      a PWM controller with an input connected to the error amplifier output to receive the error signal, the PWM controller operative to provide a pulse width modulated signal to the driver control input according to the error signal;
  a setpoint input for receiving an input setpoint signal to set an output level of the DC-DC converter via the PWM circuit; and
  a waveform generator operative to provide the converter setpoint signal to the first input of the error amplifier of the PWM circuit at least partially according to the input setpoint signal, the converter setpoint signal having rise time values of 1 us or more and 10 ms or less and fall time values of 1 us or more and 10 ms or less.

15. The electronic driver apparatus of claim 14, where the rise time values and the fall time values are different.

* * * * *